(No Model.)
J. N. MAYHEW.
AXIOMETER.
No. 571,781. Patented Nov. 24, 1896.
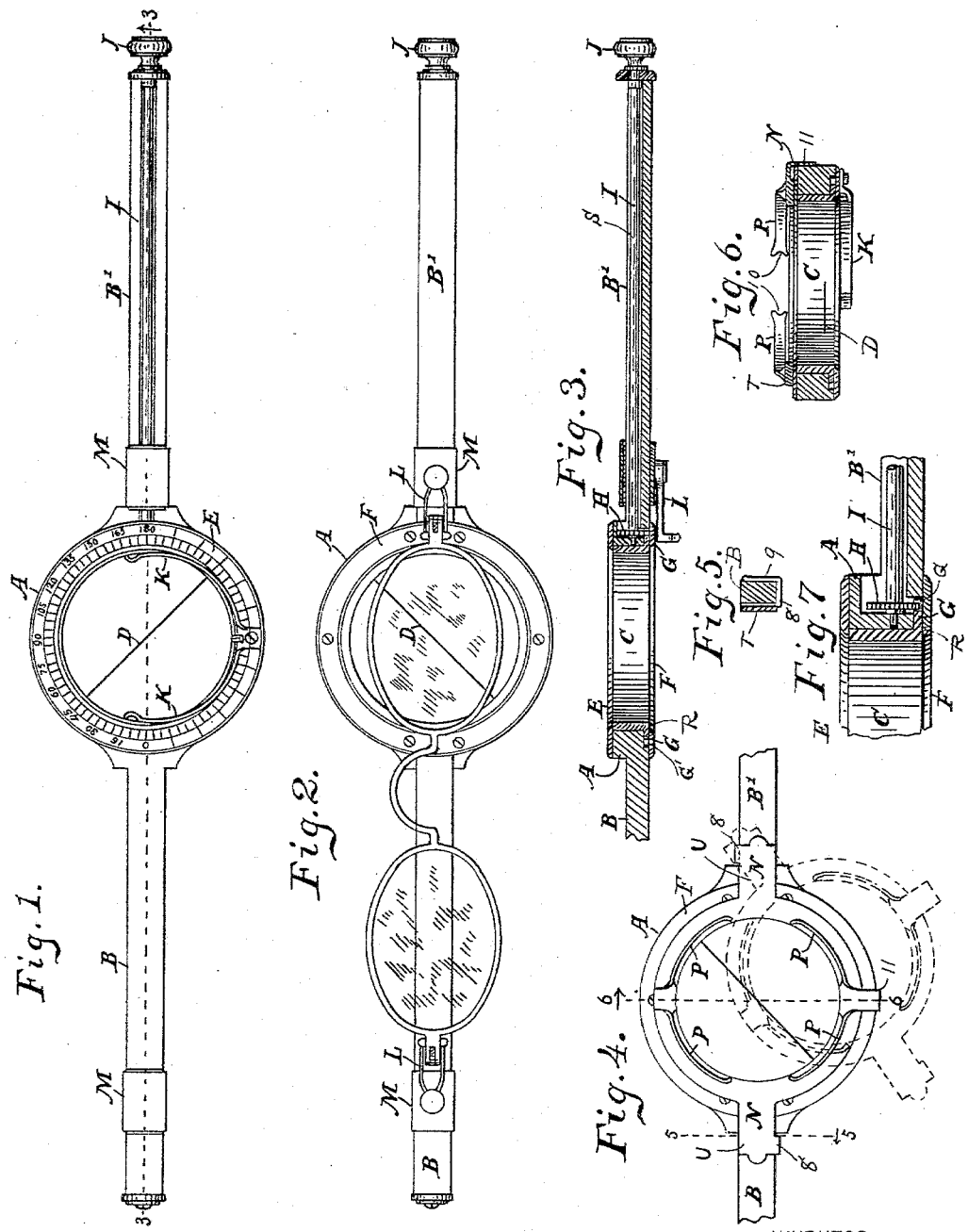
WITNESSES:
Chas N Leonard.
O. F. Mayhew
INVENTOR
Jas. N. Mayhew

UNITED STATES PATENT OFFICE.

JAMES N. MAYHEW, OF INDIANAPOLIS, INDIANA.

AXIOMETER.

SPECIFICATION forming part of Letters Patent No. 571,781, dated November 24, 1896.

Application filed August 8, 1895. Serial No. 558,659. (No model.)

*To all whom it may concern:*

Be it known that I, JAMES N. MAYHEW, a citizen of the United States, residing at Indianapolis, in the county of Marion and State of Indiana, have invented a new and useful Axiometer, of which the following is a specification.

My invention relates to a device for the determination of angle of axis of plano or compound cylindrical lenses used in spectacles; and it consists in an instrument devised to hold and enable the operator to make ready and accurate measurement of the lens, as hereinafter more fully described. I attain this object by the instrument illustrated in the accompanying drawings, in which—

Figure 1 is a rear view of the instrument, showing degree-vernier and spring-clamp for holding a neutralizing-lens. Fig. 2 is a top or front view with spectacle-front placed thereon to show manner of using. Fig. 3 is a longitudinal section on line 3 3, Fig. 1. Fig. 4 is a front view of the central portion, showing an attachment for holding eyeglasses or single lenses; Fig. 5, a section on line 5 5, Fig. 4. Fig. 6 is a section on line 6 6 of Fig. 4. Fig. 7 is a detail on an enlarged scale.

The same letters and numerals of reference indicate the same parts in the several figures.

The main frame of the instrument is composed of the central annular portion A and a pair of oppositely-extending radial arms B and B'. Mounted in said annular part A so as to revolve freely therein is a ring C, provided at one end with a flange G, carrying a series of teeth G' upon its periphery. Flange G rests in an annular recess R, formed in the front surface of the part A, and secured to said surface is an annular plate F, the inner edge of said plate projecting over the flange G, and thereby holding ring C in part A. Secured to the opposite face of part A is an annular vernier-plate E, the inner edge of which projects over ring C, and said plate is provided with a series of suitable divisions to indicate angular degrees. Ring C is provided with a fine wire or indicator D, which is stretched diametrically across said ring and secured thereto near the vernier-plate, so that when brought to coincide with the axis of a lens the angle thereof may be quickly read from said vernier.

In order to rotate ring C and thereby change the angular position of indicator D, I mount in a slot S, formed in arm B', a shaft I, provided at one end with a gear H, adapted to engage teeth G' of flange G, and at the other end is provided with a milled head J, adapted to be engaged by the fingers of the operator. The lens to be examined being already set in spectacle-frames, it is essential that its pupilary center be held as nearly as practicable at the center of part A and in a plane parallel to the face of said part. For this purpose I mount upon each of arms B and B' a slide M, adapted to be moved longitudinally upon said arms. Secured to one surface of each of slides M is a spring-grip L, the said grip consisting of a pair of spring-arms, the ends of which are adapted to engage the ends of a spectacle-frame and to support said frame parallel to the face of the main frame.

For the purpose of holding eyeglass-lenses or single unset lenses an attachment N is provided. Said attachment consists of a central annular plate T, the opening in which is substantially the same as the opening in part A of the main frame. Secured to plate T, or preferably formed integral therewith, are two oppositely-extending arms U, and the outer end of each of said arms is provided with a spring-clip 8, each of said clips having a portion 9 substantially parallel with plate T. Parts 9 of clips 8 extend in opposite directions, and the arrangement is such that arms B and B' may be embraced between said clips and plate T at a point close to the central portion A, as shown in Fig. 5. Secured to the outer face of plate T are two oppositely-arranged springs P, each provided with a pair of oppositely-extending arms, in the outer or free end of each of which is formed a notch 10. Secured to plate T is a stop 11, adapted to project over and engage part A of the main frame and thereby sustain attachment N centrally in front of the opening in part A.

In order to determine the angle of the axis of a spherical or prismatic lens, I secure to the vernier side of the main frame a spring-clamp K, adapted to receive a proper lens to neutralize the spherical or prismatic property and to hold it in front of the opening in part A, thereby enabling the operator to examine the cylindrical property alone and to determine the angle of its axis.

The operation of my device is as follows: Supposing it is desired to measure the angle of the axis of a lens which is already set in a spectacle-frame, such as that shown in Fig. 2. The ends of said frame are introduced between spring-grips L on slides M. Slides M are then moved longitudinally on arms B and B' until the pupilary center of the lens to be examined is brought substantially opposite the center of the opening in part A of the main frame. The operator then looks through the lens, and, grasping head J of shaft I, he turns said head and rod, and by means of gears H and G' turns ring C and indicator D until said indicator coincides with the axis of the lens. When this is done, the operator can then immediately read from the vernier the angle of the lens. If it is desired to measure the other lens, slides M are moved until the said lens is opposite the opening in part A and the operation is completed.

In case the lens to be examined is unset or is set in an eyeglass-frame, attachment N is secured to the main frame in the following manner: One of clips 8 is slipped over arm B', the said arm being grasped near part A, between part 9 and plate T, and the attachment lying in the position indicated by dotted lines in Fig. 4. The attachment is then rotated upon the engaged clip as a center until the clip on the opposite side of plate T comes in engagement with arm B, stop 11 coming into contact with the periphery of part A when the attachment is in the proper position. The lens to be examined is then placed between the ends of springs P, the said lens resting in and being engaged by the notches 10 of said springs. In case the lens to be examined is a spherical or prismatic one a suitable neutralizing lens may be secured between the ends of spring K.

The ring C may be secured in the main frame in any suitable manner, and said ring may be rotated by means of short studs fixed to its rear end, if so desired.

I claim as my invention—

1. In an axiometer, the combination with the main frame, of a ring mounted so as to rotate therein and provided with an indicator extending across the opening therein, a pair of slides mounted on the main frame and adapted to be moved toward and from the center of said ring, and means carried by said slides for engaging with and holding a spectacle-frame, as and for the purpose set forth.

2. In an axiometer, the combination with the main frame, of a ring mounted so as to rotate therein and provided with an indicator extending across the opening therein, a pair of slides mounted on the main frame and adapted to be moved toward and from the center of said ring, and a spring-grip carried by each of said slides and adapted to engage and hold a spectacle-frame, substantially as described.

3. In an axiometer, the combination with the main frame, of a ring mounted so as to rotate therein and provided with an indicator extending across the opening thereof, and means carried by said main frame for engaging and supporting a lens in front of said opening.

4. In an axiometer, the combination with the main frame, of a ring mounted so as to rotate therein and provided with an indicator extending across the opening thereof, means for engaging and supporting a lens in front of said opening, and a suitable scale for indicating the angular position of the indicator, substantially as set forth.

5. In an axiometer, the main frame composed of an annular central portion and a pair of oppositely-extending radial arms secured thereto, a ring mounted in said central portion and adapted to be rotated therein, an indicator extending across the opening of said ring, a pair of slides mounted one on each of said radially-extending arms of the main frame and longitudinally movable thereon, and means carried by said slides for engaging a spectacle-frame, substantially as and for the purpose set forth.

6. In an axiometer, the main frame composed of an annular central portion and a pair of oppositely-extending radial arms secured thereto, a ring mounted in said central portion and adapted to be rotated therein, an indicator extending across the opening of said ring, a shaft mounted in one of the arms of the main frame and provided at one end with a gear adapted to engage with suitable teeth carried by the ring, and at the other end provided with means for rotating said shaft, a pair of slides mounted one on each of the arms of the main frame, and means carried by said slides for engaging and holding a spectacle-frame, substantially as set forth.

7. In an axiometer, the main frame composed of an annular central portion and a pair of oppositely-extending radial arms secured thereto, a ring mounted in said central portion and adapted to be rotated therein, an indicator extending across the opening of said ring, a shaft mounted on one of the arms of the main frame and provided at one end with a gear adapted to engage with a series of teeth carried by the ring, and at the other end with means for rotating said shaft, a pair of slides mounted one on each of the arms of the main frame, and a spring-grip carried by each of said slides for engaging and supporting a spectacle-frame, as and for the purpose set forth.

8. In an axiometer, the main frame composed of the annular central portion and a pair of oppositely-extending radial arms secured thereto, an annular recess formed in one surface of said central portion, a ring mounted in said central portion and provided with a flange adapted to rest in said annular recess, a series of teeth formed on said flange, an indicator extending across the opening of said ring, a shaft mounted in one of the arms of the main frame and provided at one end with a gear adapted to engage with the teeth on said flange, and provided at the other end with means for rotating said shaft, a pair of slides mounted one on each of the arms of the main frame, and means carried by said slides for engaging and supporting a spectacle-frame, substantially as described.

9. In an axiometer, the combination with the main frame, of a ring mounted so as to rotate therein and provided with an indicator extending across the opening thereof, means carried by the main frame for supporting a lens in front of said opening, and means also carried by the main frame for supporting a neutralizing-lens at the rear of said opening, substantially as and for the purpose set forth.

10. In an axiometer, the combination with the main frame, of a ring mounted so as to rotate therein and provided with an indicator extending across the opening thereof, and an attachment adapted to be secured to said main frame in front of the opening of said ring and adapted to hold a lens in front of said opening, as and for the purpose set forth.

11. In an axiometer, the combination with the main frame and a ring mounted so as to rotate therein and provided with an indicator extending across the opening thereof, of an attachment for said main frame consisting of an annular plate provided with a pair of arms each provided with a spring-clip for engaging the main frame, and a pair of springs secured to one surface of said annular plate and adapted to engage and hold a lens in front of the opening therein, substantially as set forth.

12. In an axiometer, the combination with the main frame consisting of the annular central portion and a pair of oppositely-extending arms secured thereto, a ring mounted in said central portion so as to rotate therein, and an indicator secured to said ring and extending across the opening thereof, of an attachment for said main frame consisting of the annular plate T provided with a pair of oppositely-extending arms U each provided with a spring-clip adapted to engage the arms of the main frame, and a pair of springs P secured to one face of plate T and adapted to engage and support a lens in front of the opening in said plate and in front of the opening in said central portion of the main frame, all combined and arranged to coöperate substantially as and for the purpose set forth.

JAS. N. MAYHEW.

Witnesses:
  O. F. MAYHEW,
  GEORGE WALLACE.